Patented June 30, 1942

2,288,413

UNITED STATES PATENT OFFICE 2,288,413

PLASTICIZED ARTICLE OF MANUFACTURE

Willard L. Morgan, Edgewood, R. I., assignor to Sylvania Industrial Corporation, Fredericksburg, Va., a corporation of Virginia No Drawing. Application August 2, 1938, Serial No. 222,642

1 Claim. (Cl. 106—168)

The invention relates in general to a conditioned article formed from organic, colloidal materials swelling in water, and in particular to an article formed from such materials having improved flexibility, as well as to correlated improvements directed toward softening and enhancing the surface characteristics of such articles.

This application is a continuation in part of application Serial No. 21,914 filed May 16, 1935.

It has heretofore been the practice to soften and improve the flexibility of organic, colloidal materials swelling in water by incorporating in these materials a hygroscopic substance such as glycerine, glycols, glucose, sugar and other polyhydric organic compounds. All of these substances have numerous disadvantages, chief among which is that they do not have any substantial softening or flexibilizing capacity in themselves but merely render the material soft by the absorption of water. Accordingly, the flexibility of the materials varies greatly according to the variation in moisture content of the ambient atmosphere. For example, a sheet of regenerated cellulose containing about 12% of glycerine and about 8% of water will absorb water in damp atmospheres and the surface will become tacky, but in dry atmospheres the sheet will lose moisture and become brittle. Moreover, it is necessary to vary the quantity of glycerine according to the season of the year and according to the thickness of the material. Furthermore, organic colloidal materials plasticized with hygroscopic substances of the class mentioned do not retain their flexibility at elevated temperatures nor at temperatures approaching the freezing point of water.

It has also been suggested to employ, as plasticizers for organic colloidal materials swelling in water, hygroscopic, water soluble inorganic compounds such, for example, as calcium chloride, orthophosphoric acid, and the like. In addition to having the disadvantages of the polyhydric organic substances above mentioned, these inorganic compounds have the further disadvantage of crystallizing out in the material, thus causing brittleness and decreasing the transparency and strength of the material.

It is an object of the invention to overcome the disadvantages of the prior methods of plasticizing organic, colloidal materials in gel form and swelling in water by incorporating in such materials a compound characterized by being water soluble and capable of maintaining the flexibility of the material at low, ordinary and slightly elevated temperatures.

It is another object of the invention to provide a plasticized colloidal material in gel form and swelling in water by incorporating in such materials a relatively large proportion of a plasticizer that does not render the surface of the material tacky, produce brittleness, or impair the transparency and strength thereof.

It is a specific object of the invention to provide a plasticizer for cellulose hydrate which is characterized by being water soluble and capable of maintaining the flexibility of the material at low, ordinary and slightly elevated temperatures.

Other objects of the invention will in part be obvious and will in part appear hereinafter.

The invention accordingly comprises an article of manufacture possessing the features, properties, and the relation of elements which will be exemplified in the article hereinafter described and the scope of the invention will be indicated in the claim.

According to the invention, it has been found that organic hydrophilic colloidal materials in gel form may be rendered permanently flexible and their texture improved by incorporating in such materials a plasticizer comprising a water-soluble, aliphatic, organic nitrogen compound containing pentavalent nitrogen in an amount sufficient to plasticize the organic colloidal material and improve its flexibility, preferably from 10% to 20% by weight.

Suitable as plasticizers are nitrogen compounds containing pentavalent nitrogen and selected from the group consisting of quaternary ammonium compounds and salts of primary, secondary and tertiary aliphatic amines, amides, including urea and thiourea, the salts being formed by conventional neutralization reactions between the acids and the nitrogen compounds. Inorganic acids that may be utilized include hydrochloric, phosphoric, carbonic, thiocyanic, and of the aliphatic organic acids mention may be made of formic, acetic, lactic, citric, maleic, tartaric, glycollic, and the like which contain preferably less than five carbon atoms in a straight chain. These nitrogen compounds may be considered as derived from ammonia by a substitution of one or more of the hydrogen atoms thereof, and by utilization of the pentavalency of nitrogen. If desired, the plasticizers may be used singly, or in compatible admixtures with each other, or in admixture with previously known plasticizers, such, for example, as a hygroscopic organic compound, such as glycerine, or a hygroscopic inorganic compound, such as calcium chloride and/or a fireproofing agent, a coloring material, and a substance for weighting or otherwise conditioning the material.

The process may be applied for the plasticizing of various film-forming organic hydrophilic cellulosic colloids, such, for example, as water-soluble cellulose ethers, alkali-soluble cellulose ethers and cellulose hydrate. The cellulose hydrate may be derived from viscose, cupra-ammonium cellulose, zinc chloride solutions of cellulose, from the denitration of nitrocellulose, and from the deesterification of cellulose esters, as cellulose acetate. The coagulation of the viscose and of the alkali-soluble cellulose ether from their aqueous alkaline dispersions may be accomplished in a conventional acid bath, which procedure is well known in the art as illustrated in U. S. Patents No. 1,548,864 (page 2) and No. 1,589,606 (page 3) respectively. The organic water-swelling colloids may be treated in the form of filaments, films, sheets, bands, hollow bodies, and other articles fabricated in whole or in part of such colloids.

With more particular reference to the plasticizer it should be noted that the aliphatic organic nitrogen compounds employed are characterized by being water soluble, and hence capable of being applied to the materials of articles by means of an aqueous solution.

If desired, the plasticizer may be incorporated in the initial solution of the colloid before it is cast or molded into the desired article and/or it may be incorporated in the material during or after the setting or forming operation. Alternatively, the plasticizer may be applied to the material by the use of known coating or spraying apparatus. By varying the concentration of the plasticizer in the solution, the amount taken up and incorporated in the material and the degree of softening may be controlled.

By way of illustrated the process, but not by way of limiting the invention, there may be given the following example:

A web of cellulose hydrate, which is in a water-swollen condition, may be passed through a bath containing a 20% solution of methyl amine lactate in water. The web coming from the bath is passed preferably through means for removing the surplus liquid such, for example, as squeegee rollers or doctor blades, and may be passed next into a suitable drying apparatus wherein water is evaporated until the moisture content is about 8% thereof by weight. The product coming from the drier is non-tacky, odorless, tasteless and has a high degree of flexibility at low, ordinary and slightly elevated temperatures, such as 60°–90° C.

In the above example, the methylamine lactate may be replaced by any of the following organic nitrogen compounds, which are merely illustrative of the invention.

Methylamine lactate
Ethylamine citrate
Butylamine tartrate
Amylamine formate
Tetramethylammonium hydroxide
Mono-triethanolamine malate
Di-triethanolamine malate
Urea malate
Propylamine acetate
Di (triethanolamine) monohydrogen phosphate
Di (monoethanolamine) monohydrogen phoshate
Di (amino propandiol 2.3) monohydrogen phosphate It will be seen that by the present invention there has been provided a novel process for plasticizing water-swelling organic colloids. The water-soluble aliphatic organic nitrogen compounds used as plasticizers are characterized by numerous advantages, chief among which is the fact that these compounds may be incorporated in the material in a higher concentration than is possible with prior plasticizers. The higher the concentration of the plasticizer, the higher may be the temperature at which the plasticizer material may be dried, in consequence of which the speed of commercial production of continuous sheet material, endless bands and tubing may be increased.

Moreover, materials containing relatively higher concentrations of the plasticizers may be coated with suitable moistureproofing compositions such, for example, as cellulose derivative lacquer, and the lacquer solvents evaporated out of the coating at an elevated temperature without the danger of simultaneously evaporating from the sheet material enough water to render the sheet material brittle. This results in a substantial saving and frequently obviates the necessity of pre-humidifying, or post-humidifying the coated material in order to maintain its flexibility.

The pentavalent nitrogen compounds utilized in the invention are superior to trivalent nitrogen compounds in that they have, generally speaking, high molecular weights, higher boiling points and less tendency to evaporate from the plasticized sheet than the trivalent nitrogen compounds. Further, the pentavalent compounds show less tendency to crystallize within the sheet so that a larger amount can be employed than with trivalent compounds without obtaining a cloudy or hazy product.

Furthermore, since the plasticizers of the present invention are relatively non-hygroscopic as compared to the inorganic and organic compounds heretofore used, it is apparent that the treated materials of the invention do not become tacky in atmospheres of high humidity. It has also been found that these plasticizers impart to colloidal materials swelling in water a soft velvety surface finish and reduce the noise arising from handling the material. The plasticized sheet material is further characterized by being free-flowing when stacked or rolled, and the transparency of the material is not impaired even with high concentrations of the plasticizers because many of these plasticizers herein disclosed are non-crystallizing liquids.

Since certain changes may be made in the above article and different embodiments of the invention could be made without departing from the scope thereof, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

As an article of manufacture, a pellicle of hydrophilic cellulosic material, a plasticizer in the pellicle of the type which may be used in relatively large quantities without rendering the surface of the pellicle tacky, producing brittleness in the pellicle for impairing the transparency and strength thereof, and comprising a water-soluble aliphatic nitrogen compound containing pentavalent nitrogen and selected from the group consisting of quaternary ammonium compounds and salts of amines and amides, said plasticizer being present in an amount between 10 and 20 per cent of the weight of said pellicle.

WILLARD L. MORGAN.